Oct. 31, 1967
K. M. ALLEN ETAL
3,349,894
INCLINED SCREW CONVEYOR
Filed Dec. 13, 1965
2 Sheets-Sheet 1
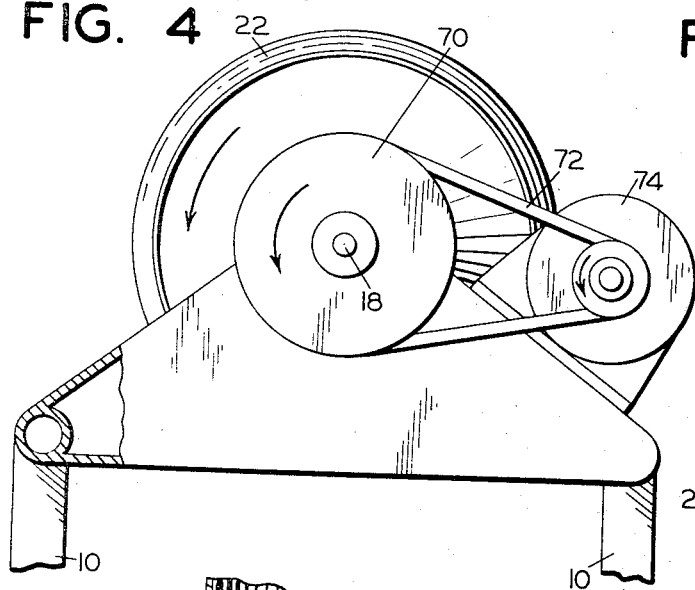
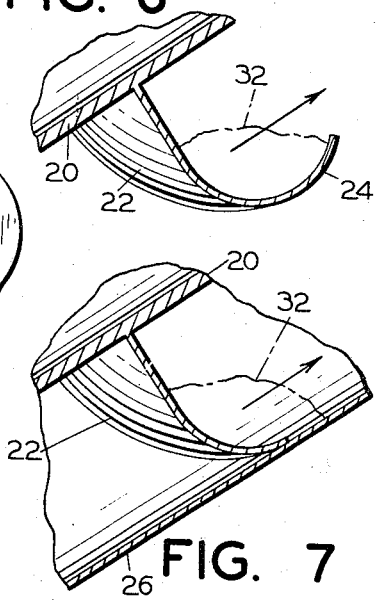
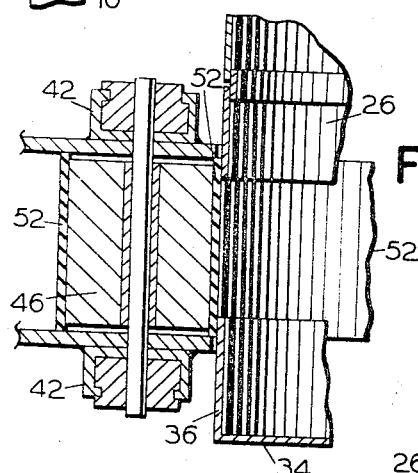
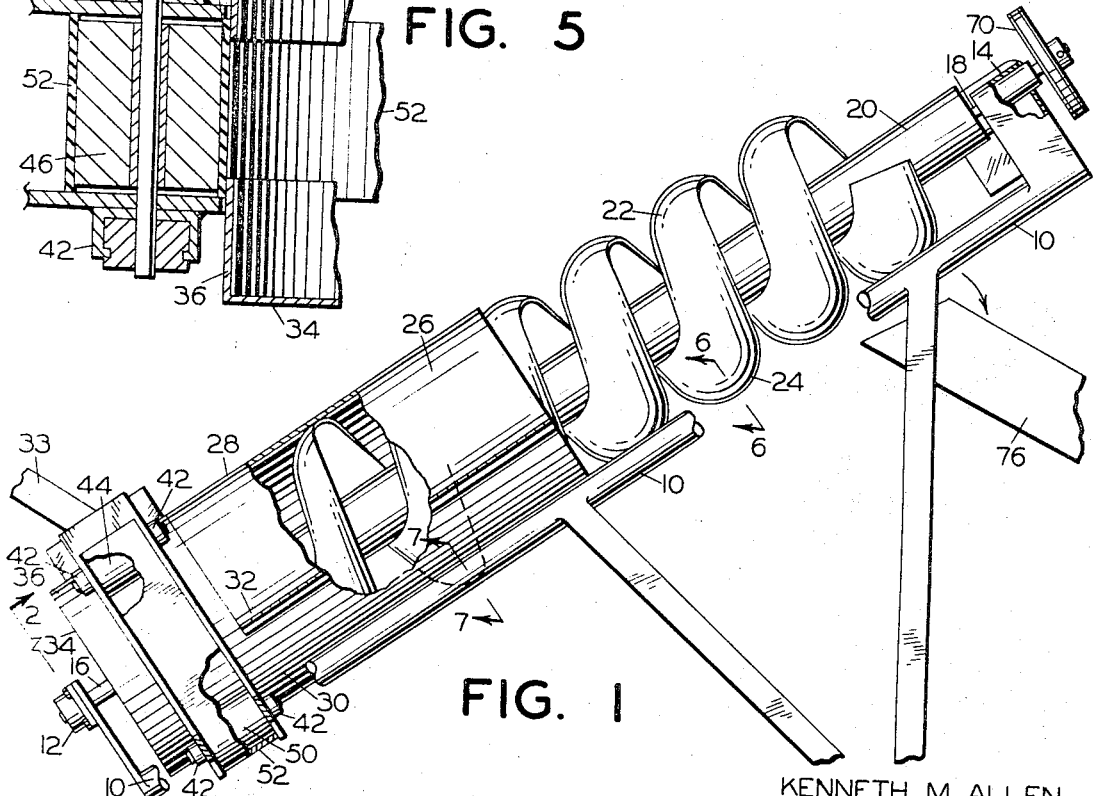
KENNETH M. ALLEN
CHESTER H. HARPER
INVENTORS
BY BUCKHORN, BLORE, KLARQUIST & SPARKMAN
ATTORNEYS

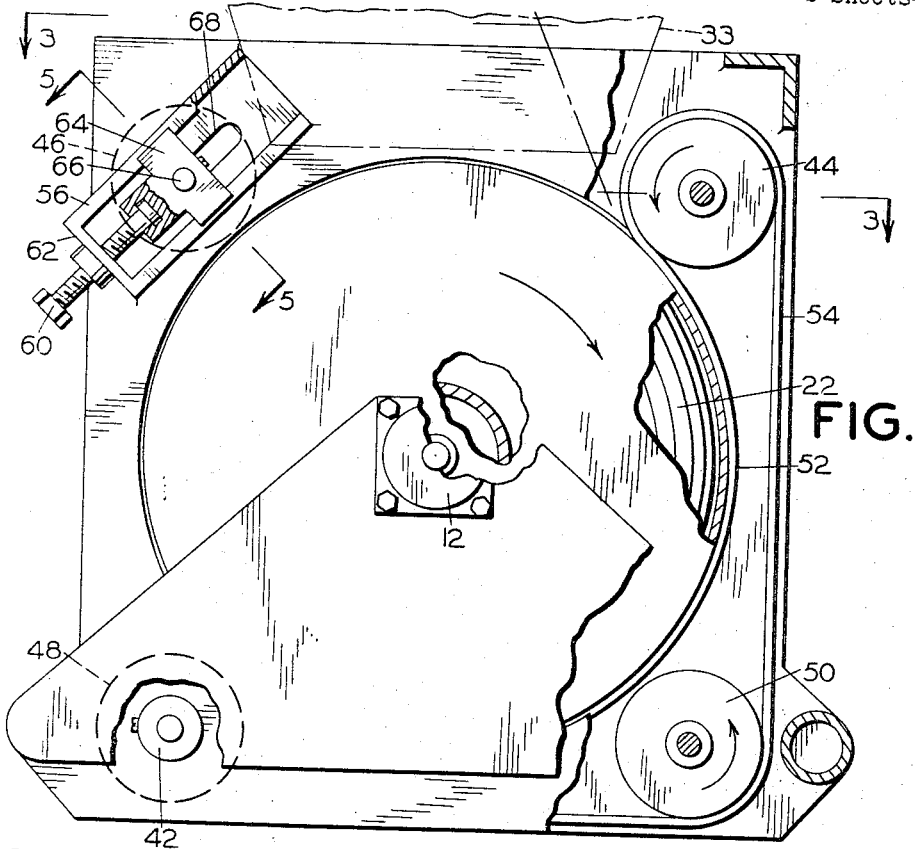
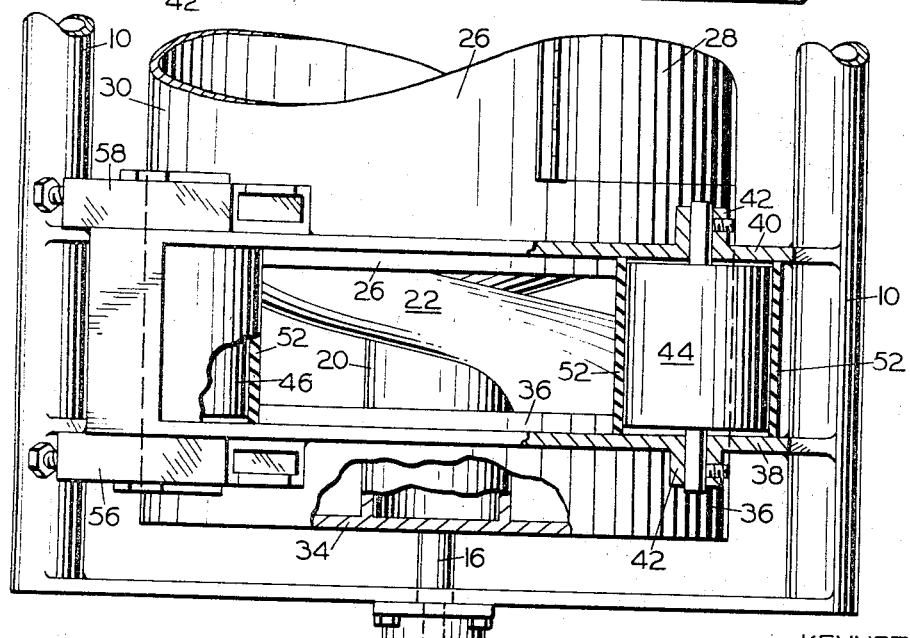
FIG. 2
FIG. 3
KENNETH M. ALLEN
CHESTER H. HARPER
INVENTORS
BY
BUCKHORN, BLORE, KLARQUIST & SPARKMAN
ATTORNEYS

United States Patent Office

3,349,894
Patented Oct. 31, 1967

3,349,894
INCLINED SCREW CONVEYOR
Kenneth M. Allen and Chester H. Harper, both of
P.O. Box 352, Newberg, Oreg. 97132
Filed Dec. 13, 1965, Ser. No. 513,256
6 Claims. (Cl. 198—215)

This invention relates to an inclined screw conveyor and particularly to such a conveyor for transporting easily crushed foodstuffs and the like.

Easily crushed food stuffs such as potato chips, corn chips, prepared cerials, and the like are most satisfactorily conveyed in apparatus employing gravity feed wherein no external pressure is applied to the conveyed material. However, a device of a different nature must be employed for elevating material from a lower level to a higher level. Conventional screw conveyors and elevators suitable for raising sturdy or compressible material frequently include parts which move with respect to one another, for example a metal screw moving with respect to a trough or cylinder. Devices of this type not only tend to exert undesired pressure on fragile material but also tend to collect particles of conveyed material between moving parts thereof resulting in apparatus that is difficult to keep clean.

It is accordingly an object of the present invention to provide an improved screw conveyor or elevator suitable for raising fragile material from one level to another.

It is another object of the present invention to provide an improved inclined screw conveyor without metal parts which move with respect to one another in the area of the conveyed material.

It is another object of the present invention to provide an improved inclined screw conveyor lacking internal parts moving with respect to one another and which is readily accessible for cleaning thereof.

Briefly, in accordance with a principal embodiment of the present invention, an inclined screw conveyor includes a central screw member having an upwardly extending cylindrical portion towards its periphery which may take the form of a cylinder rotating with the screw member or an extended lip on the helical turns of the screw member. Outer rotating means encloses the screw member at the lower or input end of the conveyor except in a radial direction upward away from the screw member wherein an input opening is provided. This outer rotating means suitably comprises a belt rotating with the screw member and substantially enclosing the same except in the aforementioned upward axial direction. The belt is carried on pulleys directing the belt closely around the screw member in a first circumferential direction and then back around the screw member in the reverse direction for avoiding the inlet opening to the conveyor. Since both of the aforementioned cylindrical cover means and outer rotating means rotate with the screw member, the conveyor has no internally moving parts, that is, components that move with respect to one another in the area of the conveyed material, and the fragile material being conveyed moves along the turns of the screw in the same manner as would such material in a gravity chute. No conveyed material is caught or ground between moving parts, nor is pressure exerted on the conveyed material, therefore resulting in a minimum breakage of material delivered to an output chute.

The subject matter which we regard as our invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements and in which:

FIG. 1 is a partially cutaway side view of an inclined screw conveyor in accordance with the present invention;

FIG. 2 is a lower end view, partially cut away of the inclined screw conveyor in accordance with the present invention taken at 2—2 in FIG. 1;

FIG. 3 is a side view, partially in cross section, of the conveyor according to the present invention taken at 3—3 in FIG. 2;

FIG. 4 is a top end view of conveyor according to the present invention;

FIG. 5 is a cross section of a belt and pulley member for providing an inlet opening of a screw conveyor in accordance with the present invention taken at 5—5 in FIG. 2;

FIG. 6 is a cross section of a screw member of the screw conveyor in accordance with the present invention taken at 6—6 in FIG. 1; and FIG 7 is a cross section of a screw member of the conveyor in accordance with the present invention taken at 7—7 in FIG. 1.

Referring to the drawings, an inclined screw conveyor in accordance with the present invention includes support structure 10 carrying a lower thrust bearing 12 and an upper bearing 14 defining an inclined axis therebetween. These bearings receive a lower end shaft 16 and an upper end shaft 18 at either end of an inclined, tubular axial member 20. The axial member 20 supports the helical turns of a screw flight or screw member 22 extending substantially from the lower end to the upper end of the axial member.

In accordance with a feature of the present invention, the screw member 22 has a substantialy constant diameter and is provided with peripheral cylindrical portions for holding the light material being conveyed. These peripheral cylindrical portions extend in an axial direction along the incline of the axial member 20. In one instance such peripheral cylindrical portion takes the form of a cup shaped lip 24 as shown most clearly in the FIG. 6 cross section. The screw member curves outwardly and upwardly in the direction which material is being conveyed. The lip curves out to the periphery of this screw member, and then back towards the axial member 20. This construction is used principally in the upper or uncovered portion of the screw conveyor. In the lower portion of the screw conveyor, the peripheral cylindrical portion for holding material takes the form of the cylindrical cover 26 closely receiving the screw member 22 at its outer periphery and rotating with the screw member during operation of the conveyor. The cylindrical cover 26 includes an upper hinged section 28 and a lower section 30 connected by a hinge 32 and which may be opened and disassambled from one another for cleaning of the conveyor. The internal configuration of the screw member 22 and cover 26 in this region is most clearly illustrated in the FIG. 7 cross section. Here it is seen the screw member 22 curves outwardly and upwardly in an axial direction and abuts the cylindrical cover member 26 at the outer periphery of screw member 22 at which point the screw member 22 is approximately tangent with cylindrical cover 26. In either the FIG. 6 instance or the FIG. 7 instance, the peripheral cylindrical extension portions of the screw member 22, the curved lip and the cylindrical cover respectively, act to contain and convey a portion of material 32.

A material inlet chute 33 is located at the lower end of the conveyor where material is discharged into the interior region of screw member 22. In this region, the axial member 20 carries a radial flange 34 carrying an outer cylinder 36 having substantially the same diameter as cylindrical cover 26 and extending towards cylindrical cover 26. Frame members 38 and 40 carried by support structure 10 include bearings 42 for pulleys 44, 46, 48 and 50. A first pair of these pulleys 44 and 46 is disposed with one on either side of inlet chute 33 defining the inlet opening of the conveyor. The axes of these pulleys are parallel to that of the axial member 20, and the peripheries of these pulleys are closely adjacent the outer periphery of screw member 22. The pulleys support a belt 52 wrapped around the screw member 22 except for the area of the inlet chute 33 which chute is located between pulleys 44 and 46. The belt 52 passes around the screw member and around pulleys 44 and 46 away from screw member 22 and then back under the screw member 22 in the reverse direction as illustrated at 54 in FIG. 2. As the screw member 22 rotates, belt 52 rotates therewith enclosing the screw member except for the inlet region. The belt 52 thus provides an outer rotating means substantially enclosing the screw member except for one radially upward direction away from the axis of axial member 20 in the region of the inlet opening. The edges of the belt 52 ride on the upper rim of outer cylinder 36 and the lower rim of cylindrical cover 26 as the belt passes around the conveyor, but the belt tends to extend inwardly towards screw member 22 in the area between the said upper rim of outer cylinder 36 and the lower rim of cylindrical cover 26.

In returning around the screw member, the belt, as shown at 54, passes over pulley 50 and pulley 48. A pair of belt tighteners 56 and 58 adjustably support pulley 46 for the purpose of taking up slack in the belt at this point and insuring movement of the belt in close relation with the conveyor. The belt tightener 56 suitably comprises an adjusting screw 60 mounted in a frame 62 also carrying a sliding bearing 64 arranged for movement along the frame 62. The bearing 64 carries shaft 66 passing through slot 68 and upon which pulley 46 is mounted. The screw member 22 of the conveyor is turned by means of a pulley 70 secured to upper end shaft 18 driven with a V-belt 72 from drive motor 74 mounted on support structure 10.

The conveyor in accordance with the present invention acts to receive material through inlet chute 33 and discharge the same at an outlet chute 76. The inclined screw conveyor in accordance with the present invention has considerable utility in conveying light, easily crushed food products such as potato chips, corn chips, cereal, and the like, since the conveyor according to the present invention has substantially no sliding parts in the area where material is being conveyed. Thus conveyed material is unlikely to be caught and ground up in the conveying apparatus. Throughout the conveyor, the conveyed material merely slides therewithin in a manner similar to action in a vertical chute and is not forced nor compressed within the conveying apparatus.

The lower portion of the conveyor including the cylindrical cover 28, the outer cylinder 36, and the belt 52, therebetween may be thought of as providing a rotating hopper having no internal parts moving with respect to one another so far as the incoming material is concerned. Due to the substantial enclosure in this hopper area, substantial amounts of material or irregular amounts of material may be received in inlet chute 33 without overflowing the conveyor. Then with the rotation of the conveyor including screw member 22, the material is gently moved in an upward direction through the cylindrical cover means 26, the latter turning with screw member 22. Upward and beyond cylindrical cover 26, since the screw member 22 is provided with upwardly extending lip 24, desirably extending from the outer periphery from screw member 22 back towards axial member 20, the material in the conveyor will be carried in a pocket or curved portion on the lower side of the conveyor such as illustrated at 32 in FIGS. 6 and 7. The material is moved gently upward where it is eventually discharged into outlet chute 76.

While we have shown and described a principal embodiment of our invention, it will be apparent to those skilled in the art that many changes and modifications may be made without departing from our invention in its broader aspects. We therefore intend the appended claims to cover all such changes and modifications as fall within the true spirit and scope of our invention.

We claim:
1. An inclined screw conveyor comprising
central helical screw means adapted for rotation about an inclined axis and provided with a peripheral cylindrical portion extending said screw means in a direction along the inclined axis thereof for holding material being conveyed,
means for rotating said screw means about said inclined axis, and
outer rotating means located toward the lower end of said screw means substantially enclosing the outer periphery of said screw means except in a radially upward direction from said inclined axis providing an inlet opening for said inclined screw conveyor,
said outer rotating means including a belt wrapped around the periphery of said screw means except in said radially upward direction from said inclined axis,
said belt turning with said screw means, and
providing an input opening for conveyed material in said radially upward direction.

2. The inclined screw conveyor according to claim 1 including pulleys on either side of said opening for positioning said belt adjacent said screw means,
said belt passing around said pulleys away from said opening and back around said screw means in the reverse direction to engage the opposite pulley while avoiding the area of said opening.

3. An inclined screw conveyor comprising an axial member supported for rotation about an inclined axis,
means for rotating said axial member about said inclined axis,
a helical screw member extending outwardly from said axial member along the inclined length thereof,
said helical screw member being turned upwardly in a direction along the inclined axis of said axial member toward the periphery of the screw member at least along the upper portion of said axial member for holding material being conveyed,
removable cylindrical cover means surrounding the periphery of said screw member from a point just above the lower end portion of said screw member and attached for rotation therewith, and
outer rotating means substantially enclosing lower end portion of said screw member below said removable cylindrical cover means except in an upward radial direction for providing an input to said inclined screw conveyor.

4. The inclined screw conveyor according to claim 3 wherein said outer rotating means comprises a belt wrapped around the periphery of said screw means except in a radially upward direction from said inclined axis,
said belt turning with said screw means, and
providing an input opening for conveyed material in said radial upward direction.

5. The inclined screw conveyor according to claim 4 including pulleys on either side of said opening for positioning said belt adjacent said screw means,
said belt passing around said pulleys away from said opening and back around said screw means in the reverse direction to engage the opposite pulley while avoiding the area of said opening.

6. The inclined screw conveyor according to claim 3 wherein said screw member is curved upwardly along said axial member toward the outer periphery of said screw member and then curved partly back toward the axial member for holding material being conveyed.

References Cited

UNITED STATES PATENTS

| 1,154,675 | 9/1915 | Vaudreuil | 198—213 X |
| 2,665,796 | 1/1954 | Anderson | 198—215 |

FOREIGN PATENTS 689,181 5/1930 France.

EVON C. BLUNK, Primary Examiner.

M. L. AJEMAN, Assistant Examiner.